US012794682B2

(12) United States Patent
Craciun et al.

(10) Patent No.: US 12,794,682 B2
(45) **Date of Patent: *Nov. 10, 2026**

(54) PRIVACY-PRESERVING FILTERING OF ENCRYPTED TRAFFIC VIA HANDSHAKE DECRYPTION AND RE-ENCRYPTION

(71) Applicant: Bitdefender IPR Management Ltd., Nicosia (CY)

(72) Inventors: Ovidiu M. Craciun, Bucharest (RO); Bogdan C. Firuti, Bucharest (RO); Daniel I. A. Fetti, Salva (RO); Constantin D. Cernat, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 99 days.

This patent is subject to a terminal disclaimer.

(21) Appl. No.: 19/059,892

(22) Filed: Feb. 21, 2025

(65) Prior Publication Data

US 2025/0192992 A1 Jun. 12, 2025

Related U.S. Application Data

(63) Continuation of application No. 17/664,803, filed on May 24, 2022, now Pat. No. 12,250,296.

(51) Int. Cl.
*H04L 9/08* (2006.01)
*H04L 61/4511* (2022.01)

(52) U.S. Cl.
CPC .......... *H04L 9/0825* (2013.01); *H04L 9/0866* (2013.01); *H04L 61/4511* (2022.05)

(58) Field of Classification Search
CPC . H04L 9/0825; H04L 9/0866; H04L 61/4511; H04L 63/0464; H04L 63/10; H04L 63/168; H04L 63/0281; H04L 63/0428; H04L 61/59; H04L 63/0227; H04L 63/101; H04L 63/20; H04L 2463/062
USPC .......................................................... 713/171
See application file for complete search history.

(56) References Cited

U.S. PATENT DOCUMENTS 8,788,822 B1 * 7/2014 Riddle ................ H04L 47/6275 713/169
10,277,562 B1 * 4/2019 Frederick ............ H04L 63/0272

* cited by examiner

*Primary Examiner* — Bryan F Wright
(74) *Attorney, Agent, or Firm* — Law Office of Andrei D Popovici, PC

(57) ABSTRACT

Described systems and methods protect client devices such as personal computers and IoT devices against harmful or inappropriate Internet content. When a client uses an encrypted handshake to hide the identity of the end server, e.g., in applications implementing an encrypted client hello (ECH), some embodiments employ a modified DNS server to provide a surrogate key to the client instead of the genuine handshake key. A traffic filter executing for instance on a network gateway may then intercept and decrypt the handshake and apply an access policy to selectively allow or deny access to the respective end server. When access is allowed, the traffic filter may re-encrypt the server identifier using the genuine handshake key before forwarding the handshake to its destination. Communication privacy is maintained since the illustrated methods only decrypt the handshake, and not the actual payload.

21 Claims, 7 Drawing Sheets

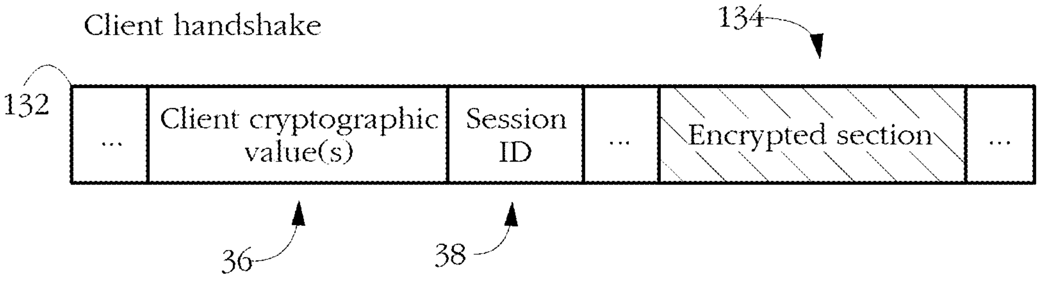
FIG. 5
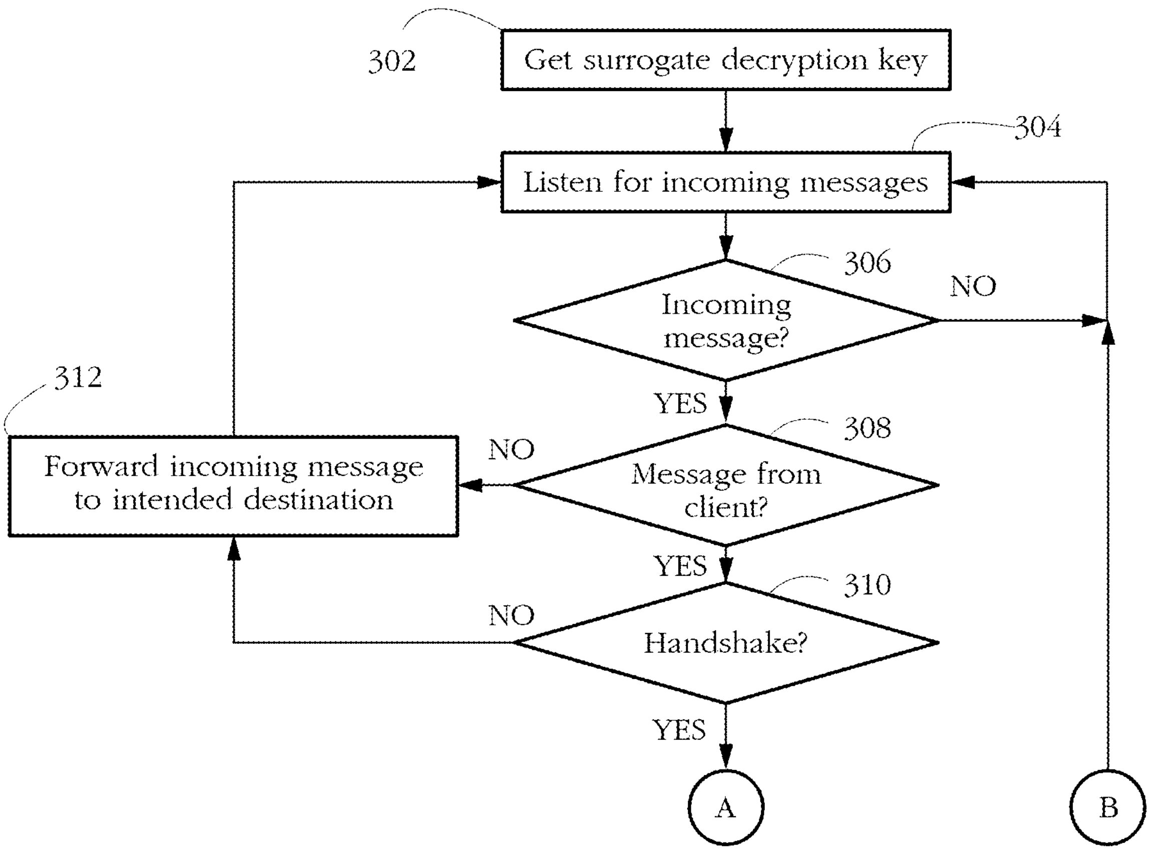
FIG. 6-A

FIG. 6-B

PRIVACY-PRESERVING FILTERING OF ENCRYPTED TRAFFIC VIA HANDSHAKE DECRYPTION AND RE-ENCRYPTION

RELATED APPLICATION DATA

This application is a continuation of U.S. patent application Ser. No. 17/664,803, filed May 24, 2022, scheduled to issue on Mar. 11, 2025 as U.S. Pat. No. 12,250,296, which is herein incorporated by reference.

BACKGROUND

The invention relates to computer security, and in particular to protecting users from malicious Internet content.

Malicious software, also known as malware, affects a great number of computer systems worldwide. In its many forms such as computer viruses, Trojan horses, spyware, and ransomware, malware presents a serious risk to millions of computer users, making them vulnerable to loss of data and sensitive information, to identity theft, and to loss of productivity, among others. An important avenue for malware proliferation consists of users inadvertently accessing malicious or fraudulent online content.

Meanwhile, an increasing number of devices informally referred to as the Internet of Things (IoT) are being connected to communication networks and the Internet. Such devices include, among others, smartphones, smartwatches, TVs and other multimedia devices, game consoles, home appliances, and various home sensors such as thermostats. As more such devices go online, they become exposed to security threats like malware and intrusion. Therefore, there is an increasing need of securing such devices against malware, as well as of protecting communications to and from such devices. A particular area wherein interest has been renewed by the advent of the Internet of Things includes access control applications, for instance parental control and preventing confidential information from being transmitted via IoT devices.

Conventional methods of protecting users and devices include employing a security appliance such as a network gateway to intercept an access request (e.g., HTTP) and/or a domain name service (DNS) request sent by a protected device while attempting to access a remote Internet resource. A domain name or an IP address specified in the intercepted request may then be compared against a blacklist of known malicious domain or addresses. The security appliance may thus block access to unsafe domains or addresses.

Recent concerns for user privacy have led to the development of encrypted domain name services, for instance DNS over hypertext transport protocol secure (DoH) described in the request for comments (RFC) 8484 of the Internet Engineering Task Force (IETF). Furthermore, some communication protocols such as Transport Layer Security (TLS) now allow encrypting at least a part of a handshake exchange, for instance to keep the destination server private. Unfortunately, such new developments in Internet communications may also hinder computer security activities by preventing an intermediary (e.g., router) from carrying out conventional traffic filtering.

There is therefore considerable interest in developing computer security systems and methods enabling traffic filtering in the case of encrypted DNS and communication protocols that use encrypted handshakes.

SUMMARY

According to one aspect, a method comprises employing at least one hardware processor of a computer system to intercept a client handshake message for establishing an encrypted communication session between a client device and a remote content server. The client handshake message includes an encrypted section storing an identifier of the remote content server. The method further comprises decrypting the encrypted section to retrieve the identifier of the remote content server and determine according to the identifier of the remote content server whether an access policy associated with the client device allows the client device to access the remote content server. In response, when the access policy allows the client device to access the remote content server, the method further comprises determining a handshake encryption key according to the identifier of the remote content server, and modifying the client handshake message by replacing the encrypted section with a substitute encrypted section storing the identifier of the remote content server. The substitute encrypted section is encrypted using the handshake encryption key. The method further comprises transmitting the modified handshake message to the destination of the client handshake message, and in response to intercepting another message sent by the remote content server within the encrypted communication session, relaying the other message to the client device.

According to another aspect, a computer system comprises at least one hardware processor programmed to execute a traffic filter configured to intercept a client handshake message for establishing an encrypted communication session between a client device and a remote content server. The client handshake message includes an encrypted section storing an identifier of the remote content server. The traffic filter is further configured to decrypt the encrypted section to retrieve the identifier of the remote content server and determine according to the identifier of the remote content server whether an access policy associated with the client device allows the client device to access the remote content server. In response, when the access policy allows the client device to access the remote content server, the traffic filter is further configured to determine a handshake encryption key according to the identifier of the remote content server, and to modify the client handshake message by replacing the encrypted section with a substitute encrypted section storing the identifier of the remote content server. The substitute encrypted section is encrypted using the handshake encryption key. The traffic filter is further configured to transmit the modified handshake message to the destination of the client handshake message, and in response to intercepting another message sent by the remote content server within the encrypted communication session, to relay the other message to the client device.

According to another aspect, a non-transitory computer-readable medium stores instructions which, when executed by at least one hardware processor of a computer system, cause the computer system to execute a network filter configured to intercept a client handshake message for establishing an encrypted communication session between a client device and a remote content server. The client handshake message includes an encrypted section storing an identifier of the remote content server. The traffic filter is further configured to decrypt the encrypted section to retrieve the identifier of the remote content server and determine according to the identifier of the remote content server whether an access policy associated with the client device allows the client device to access the remote content server. In response, when the access policy allows the client device to access the remote content server, the traffic filter is further configured to determine a handshake encryption key according to the identifier of the remote content server, and to modify the client handshake message by replacing the encrypted section with a substitute encrypted section storing the identifier of the remote content server. The substitute encrypted section is encrypted using the handshake encryption key. The traffic filter is further configured to transmit the modified handshake message to the destination of the client handshake message, and in response to intercepting another message sent by the remote content server within the encrypted communication session, to relay the other message to the client device.

BRIEF DESCRIPTION OF THE DRAWINGS

The foregoing aspects and advantages of the present invention will become better understood upon reading the following detailed description and upon reference to the drawings where:

FIG. 5 illustrates an exemplary client handshake message according to some embodiments of the present invention.

FIG. 6-B shows another exemplary sequence of steps carried out by the traffic filter according to some embodiments of the present invention.

DETAILED DESCRIPTION OF PREFERRED EMBODIMENTS

Figure 1:
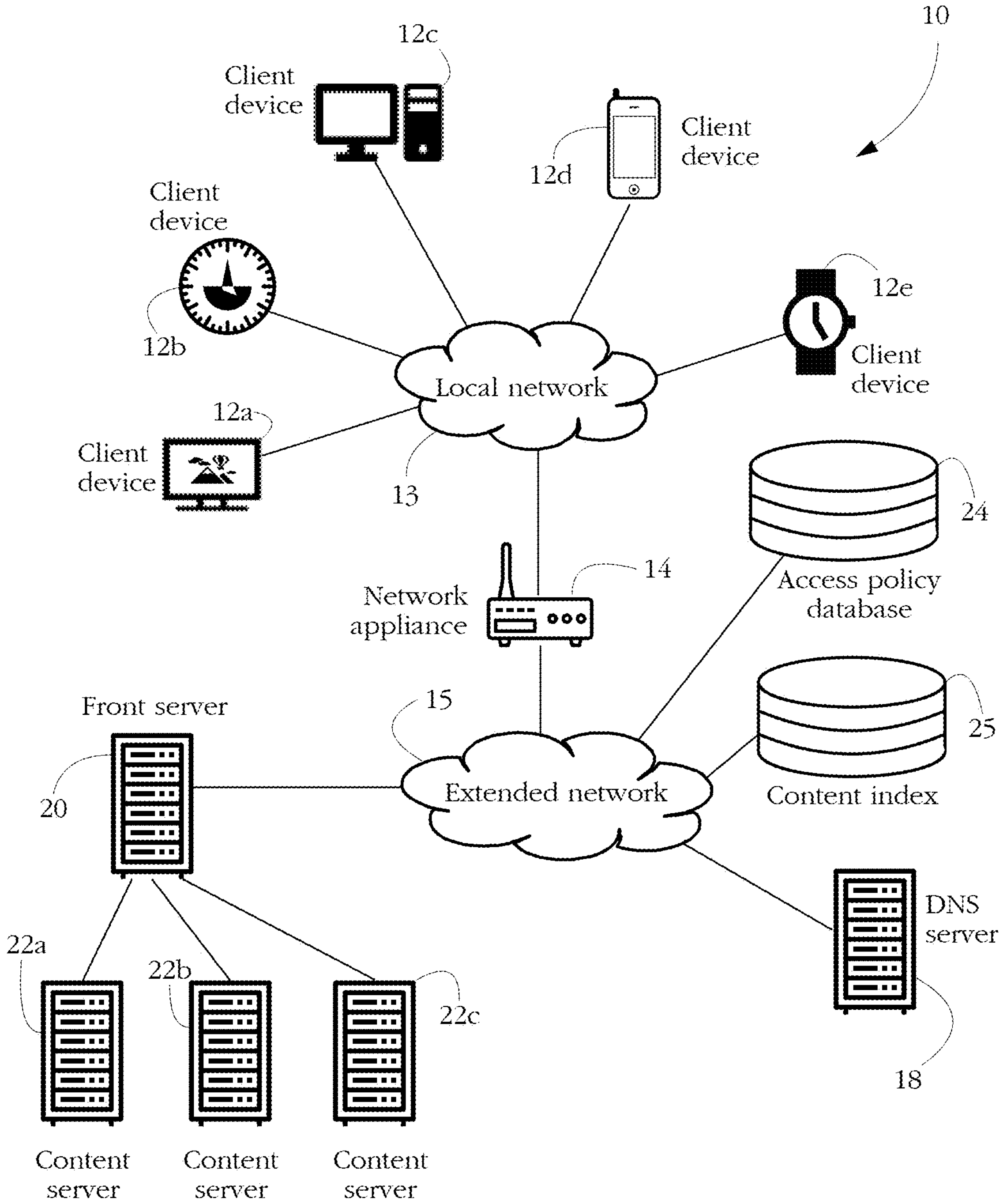
FIG. 1 shows an exemplary set of client devices protected against computer security threats according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. A network domain consists of a group of interconnected computing devices forming a distinct part of a computer network. An Internet domain is a network domain connected to the public Internet. A domain name is a label/alias identifying an address of a network/Internet domain. Resolving a domain name herein denotes determining a network address of a domain having the respective domain name. Metadata herein denote features of a transmission other than the payload itself. Exemplary metadata includes, among others, network addresses of the sender and/or receiver, a size of the payload, and a timestamp indicating a real time of the respective transmission. Two devices are said to be connected to or to belong to the same local network when their network addresses belong to the same subnet and/or when both have the same broadcast address. A wide area network includes at least one router. The term 'database' is used herein to denote any organized collection of data. A session identifier as described herein may include but is not limited to a content of a SessionID field of a TLS ClientHello record. Relaying a message herein denotes passing the respective message on without changing its content. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

FIG. 1 shows a system 10 for protecting a set of client devices 12*a-e* against computer security threats according to some embodiments of the present invention. Exemplary client devices 12*a-e* include personal computer systems, corporate mainframe computers, mobile computing platforms (e.g., laptop computers, tablets, mobile telephones), entertainment devices (e.g., TVs, game consoles), wearable devices (e.g., smartwatches, fitness bands), household appliances (e.g., refrigerators, washing machines), and any other electronic device comprising a processor, a memory, and a communication interface enabling the respective device to communicate with other devices/computer systems. Any exemplary client device 12*a-e* may request access to a remote content server 22*a-c* over a communication link, to exchange data such as web content, electronic messages, various documents, etc. In some embodiments, access to servers 22*a-c* is regulated by a traffic filter as described in detail below.

In the exemplary configuration of FIG. 1, client devices 12*a-e* are interconnected by a local network 13, such as a local area network (LAN), home network, corporate network, etc. Devices 12*a-e* may further be connected to an extended network 15, such as a wide area network (WAN) and/or the Internet. In some embodiments, at least a part of network traffic between client devices 12*a-e* and extended network 15 traverses a network appliance 14 such as a router, WiFi hotspot, network hub, etc. In the illustrated configuration, appliance 14 acts as a gateway device between local network 13 and extended network 15. In some embodiments, network appliance 14 comprises a traffic filter configured to selectively enable access to a location on extended network 15, as further detailed below. Appliance 14 may further carry out various other computer security activities, such as a firewall, scanning communications for malware, etc.

In some embodiments, system 10 further comprises a client policy database 24 and a content index 25, which may be stored on a remote server system further configured to carry out selective data insertion, data retrieval, and/or other database management operations. Databases 24, 25 may be formatted and stored according to any standard known in the art. Exemplary database formats include a relational database, an extensible markup language (XML) database, a spreadsheet, and a key-value store, among others.

Policy database 24 may store a plurality of client records related to client devices 12*a-e* and/or to the users of the respective client devices. In one example, each client record corresponds to a distinct client device 12*a-e*. A client record may store a set of identifiers of the respective client device (e.g. a client identifier as described below, a media access control—MAC address, an International Mobile Equipment Identity—IMEI number, a local network address, etc.), and an indicator of an Internet access policy specific to the respective client device. An access policy encodes a set of rules or restrictions for accessing Internet content. For instance, an access policy indicator may comprise an indicator of a category of content that the respective client device should not access (e.g., adult content, social networks, online gambling, etc.). An access policy may further include a time indicator, for instance a time interval of applicability of the respective policy. An access policy may further include a location indicator indicative of a region of applicability of the respective policy. In one such example, one access policy may apply when the respective device is connected to local network 13 (e.g., while at home), and another policy may apply when the respective device is roaming. Another exemplary policy may apply only within the bounds of a pre-determined geofence. In some embodiments, an access policy may include an identifier of a user of the respective client device, indicating that the respective policy applies when the respective client device is operated by the respective user.

In some embodiments, a client record may comprise other data which may be relevant to an access policy. Examples include an indicator of a device type (e.g., digital camera, thermostat, smartphone, tablet computer, router, car), various hardware configuration indicators of the respective client device (e.g., whether the respective device has a camera, etc.), and a list of software applications installed on the respective device. Other information stored in an exemplary client record comprises device usage data, such as statistics of network access by the respective client device, for instance the relative frequency of using various communication ports, relative traffic volume during various time intervals, etc. Other exemplary client records may include metadata describing network traffic transmitted or received by the respective client device. In some embodiments, such metadata may be organized according to a format such as IP Flow Information Export (IPFIX) from the Internet Engineering Task Force, or NetFlow(R) from Cisco, Inc.

In some embodiments, policy database 24 may store records indicating collective access policies. One exemplary collective access policy applies to all devices having a specific device profile, as defined, for instance, by a tuple of device features such as a device type and operating system. In one such example, one access policy may apply to desktop computers and another to smartphones and tablet computers. In another example, an access policy may apply to all devices having an Android® operating system older than version 10, etc. Other collective access policies may apply to all devices belonging to a group or organization. In one such example, all devices connected to local network 13 may be defined by a collective access policy attached to network appliance 14. In yet another example, one access policy may apply to devices operated by employees from an engineering department, and another access policy may apply to devices operated by employees from the legal department of a company, etc.

Content index 25 generically represents any collection of data enabling a determination of whether accessing a particular Internet resource/location/service constitutes a computer security hazard and/or an infringement of an access policy such as parental control. In a simple example, index 25 comprises a set of records indexed according to domain name or IP address, each record indicating a category of content stored at or distributed from the respective domain. Exemplary categories include malicious content (e.g., malware, fraudulent webpages, phishing webpages, dark web, etc.), adult content, streaming, gambling, social networking, e-commerce, banking, and gaming, among others.

In some embodiments, a domain name service (DNS) server 18 collaborates with a traffic filter as described below (e.g., a software component executing on appliance 14) to protect client devices 12*a-e* against computer security threats. DNS server 18 provides domain name services to client devices 12*a-e*, the respective services comprising, inter alia, translating domain names into network addresses and/or vice versa by maintaining a mapping between domain names and network addresses. Server 18 generically represents a set of communicatively coupled computers, which may or may not be in physical proximity to each other. A skilled artisan will know that the operation of DNS server 18 as described herein may be divided among multiple physical machines or processors, for instance an authoritative nameserver, a top-level domain nameserver, a root nameserver, a cryptographic keyserver, etc.

A typical communication between a client device 12*a-e* and a content server 22*a-c* comprises several steps. Such communications require knowledge of a network address (e.g., Internet Protocol-IP address) of the respective content server. Often, this address is not known to the client, for various reasons. For instance, there may be multiple mirror content server machines, and the client may be dynamically directed to the most convenient one according to the current load of each mirror server or according to the current geographical location of the client device. The client device may however know a domain name comprising an alias of the unknown network address. To establish a connection to the respective content server, a software entity executing on the respective client device may thus issue a request to access the respective domain name, instead of the IP address per se. In response, another software entity (e.g., the operating system) of the client device may attempt to translate the alias/domain name to an actual network address, and subsequently transmit the request to the correct network location.

Translating domain names to network addresses (an operation known in the art as domain name resolution) typically comprises the respective client device transmitting a DNS query to DNS server 18. The DNS query may comprise an encoding of a domain name and an indicator of a type of question Q, among others. The type of question indicates a type of DNS resource record returned by DNS server 18 in response to the respective query. Exemplary questions include 'A' which requests an IP address formulated in a 4th version of the Internet Protocol (IPv4), and 'AAAA' which returns an IP address formulated in a 6th version of the Internet Protocol (IPv6). Other exemplary questions/resource record types include 'TXT', 'PTR', 'LOC', etc. In response to the query, DNS server 18 may return a DNS reply to the requesting client, including an encoding of a network address (e.g., IPv6 address) corresponding to the respective domain name/alias.

In some cases as shown in FIG. 1, multiple content servers 22*a-c* and/or Internet domains are collectively accessed via a common network address and physical machine, illustrated by a front server 20. Such situations arise for instance in content delivery networks (CDNs) such as AKAMAI® and CLOUDFLARE® among others, and also in many applications known by the umbrella term 'cloud computing'. In such cases, all servers 22*a-c* and/or respective Internet domains are apparently located at the network address of front server 20. Stated otherwise, a DNS query for any domain associated with content servers 22*a-c* will return the IP address of front server 20. To enable front server 20 to selectively direct an incoming access request to the proper content server 22*a-c*, the respective access request is typically configured to include the desired domain name, for instance in the form of a server name indicator (SNI) as described in IETF's RFC3546, among others.

Figure 2:
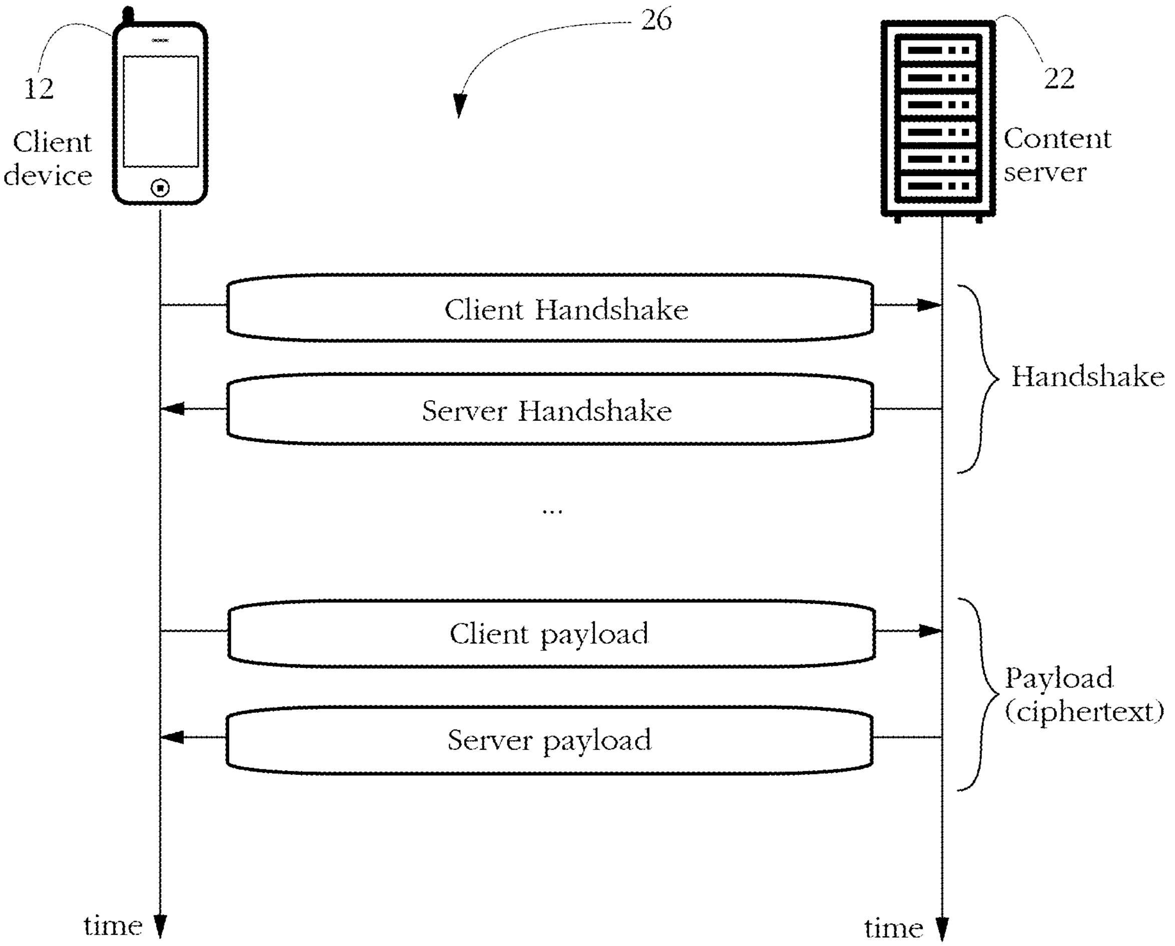
FIG. 2 (PRIOR ART)
FIG. 2 shows a typical data exchange carried out according to a protocol for encrypted communications as known in the art.

Some client-server communications may be encrypted. FIG. 2 illustrates a generic encrypted communication session 26 between a client device 12 and a content server 22 according to a protocol such as transport layer security (TLS). Session 26 typically comprises a handshake wherein client 12 and server 22 exchange various preliminary metadata including cryptographic parameter values to be used by the communicating parties to encrypt and/or decrypt the payload. Exemplary cryptographic parameters include a cryptographic key (e.g., a public key of an asymmetric keypair), a nonce, a random seed value, etc. Exemplary handshake messages according to a version of TLS include a ClientHello and a ServerHello message, among others. In some protocols, the handshake part of a session further comprises an authentication exchange wherein server 22 presents a certificate to client device 12, the respective certificate enabling client device 12 to verify the identity of server 22.

The handshake is typically followed by the communication payload encrypted according to cryptographic parameter values (e.g., encryption keys, etc.) negotiated during the handshake. The payload herein represents a part of the communication which is meant to be readable (i.e., in cleartext) only by the communicating parties, and in general comprises a content of a message, as opposed to metadata describing the respective message, session, or communication. Exemplary payloads include a content of a document, email, web page, video stream, and instant message, among others.

The payload part of session 26 may include multiple encrypted messages transmitted by each party. Stated otherwise, there is a one-to-many correspondence between a handshake and multiple payloads. Session 26 is therefore defined as consisting of a handshake and the totality of messages encrypted according to the respective handshake. Two encrypted messages belong to the same encrypted communication session only when both are encrypted using cryptographic values negotiated during the same handshake exchange.

Some protocols attach session-specific metadata such as a session identifier to encrypted payload messages, thus enabling the communicating parties to associate each message to a set of session-specific cryptographic parameter values. Tagging messages with a session identifier further enables asynchronous communications, e.g., suspending a session and resuming it later without a new handshake.

In some communication protocols such as TLS version 1.3, some of the handshake exchange is itself encrypted, albeit using keys distinct from those used for encrypting the payload. To distinguish between the two sets of cryptographic keys/parameter values, keys used to encrypt parts of the handshake will herein be deemed handshake keys, while keys used to encrypt the payload will herein be deemed application keys.

Such communication protocols may be used to hide the identity of a content server from third parties. In one example known as an Encrypted Client Hello (ECH) and illustrated in FIG. 3, client device 12 initiates an encrypted communication session with a content server 22 by transmitting a client handshake message 32 to front server 20. Client handshake 32 comprises an encrypted section 34 specifying various parameters that the client wants to hide from a third party. For instance, section 34 may include a domain name/SNI of content server 22. Section 34 is encrypted using a handshake encryption key 50 (e.g., a public key of an asymmetric keypair associated with front server 20).

As part of the ECH protocol, client device 12 may obtain key 50 from DNS server 18. Server 18 may attach an IP-specific handshake key to each DNS record associating a domain name to a respective IP address. In situations as illustrated in FIG. 1 wherein a single front server 20 controls access to multiple content servers 22*a-c*, a single handshake key 50 may be associated with front server 20, as well as with all servers 22*a-c* since they may all share the same IP address of front server 20. In response to a DNS query 42 requesting DNS server 18 to resolve the domain name of content server 22, DNS server 18 may selectively retrieve handshake key 50 according to the resolved IP address and transmit key 50 to client device 12 in addition to the respective IP address. Key 50 may be included in a DNS reply 44, for instance within a TXT section.

Figure 3:
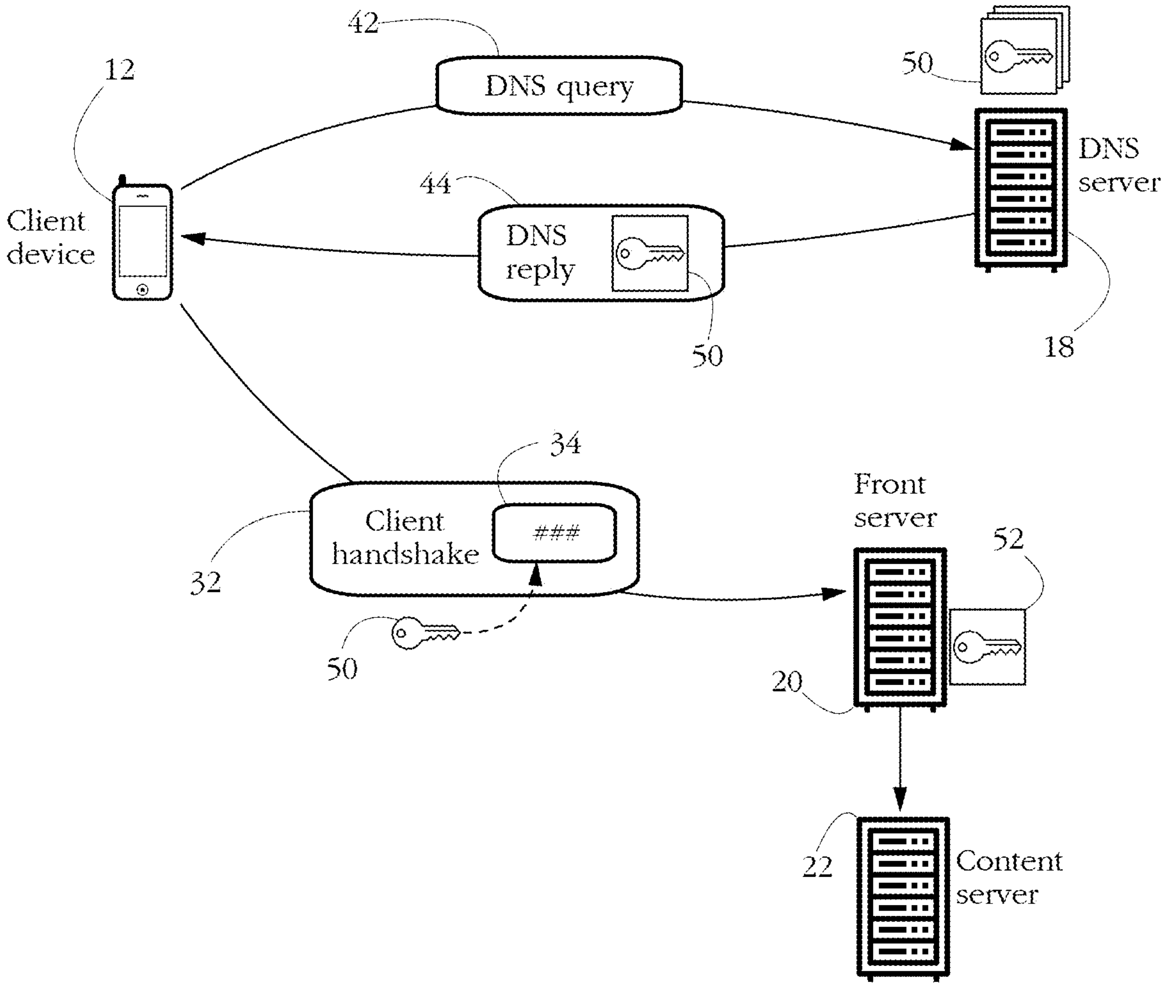
FIG. 3 (PRIOR ART)
FIG. 3 illustrates an exemplary data exchange according to a version of a communication protocol that uses encrypted handshakes.

In response to receiving client handshake 32, front server 20 may decrypt section 34 using a handshake decryption key 52 (e.g., a private key associated with front server 20). Front server 20 may thus recover the SNI of server 22 and redirect the client handshake to the appropriate destination. However, since key 52 is only available to front server 20, in principle nobody else can see the respective SNI in cleartext. Therefore, conventional computer security methods relying on intercepting client handshake 32 and inspecting the SNI no longer work in situations as illustrated in FIG. 3.

Figure 4:
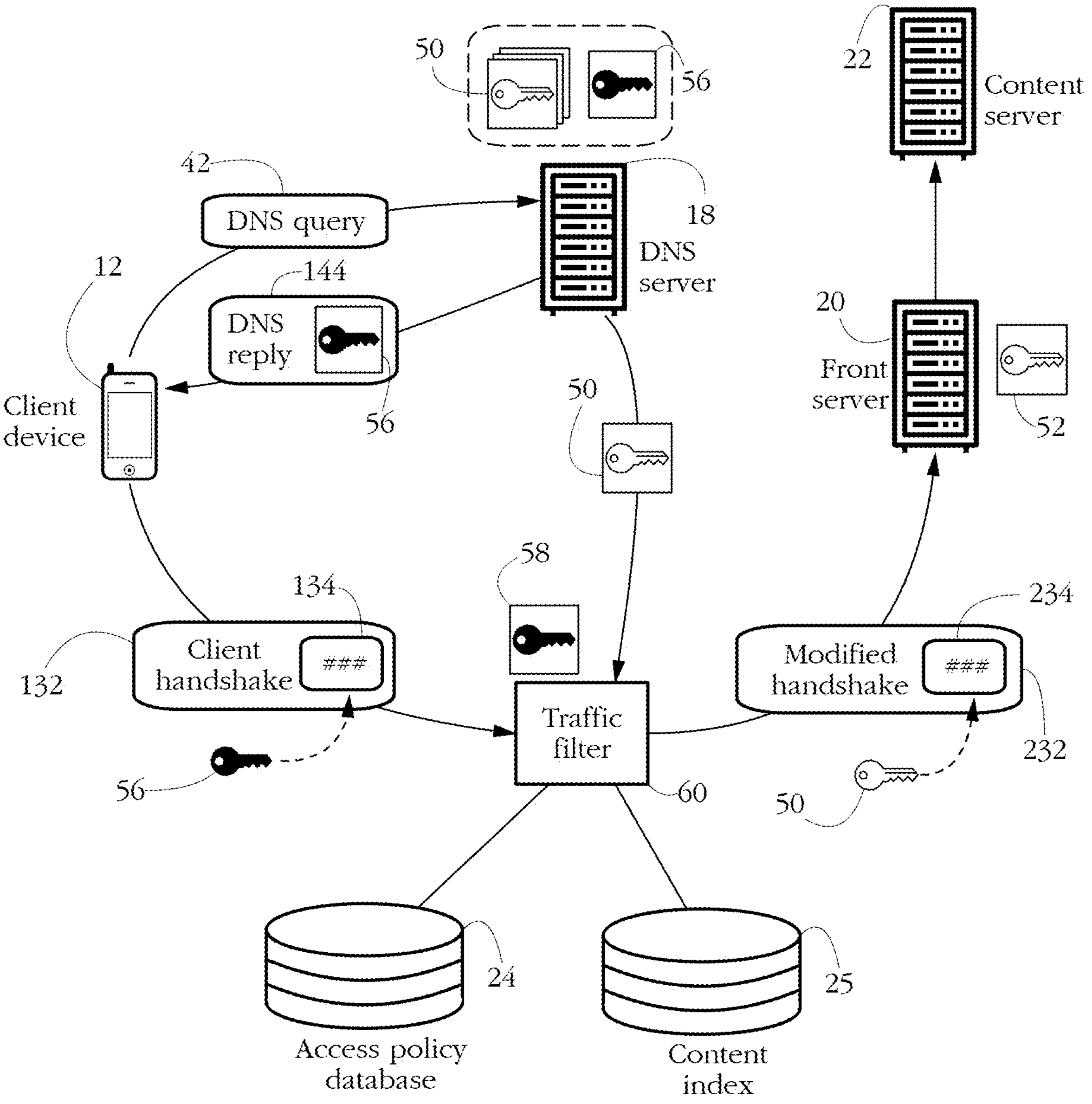
FIG. 4 shows exemplary data exchange between a client device, a DNS server, and a front server according to some embodiments of the present invention.

FIG. 4 shows an exemplary data exchange carried out between client device 12, DNS server 18 and front server 20 in some embodiments of the present invention. A traffic filter 60 collaborates with DNS server 18 to protect client device 12 from computer security threats such as malicious software and online fraud, among others. Traffic filter 60 may be embodied as a set of software modules executing on network appliance 14, client device 12, front server 20, and/or any other network device which can intercept traffic between client device 12 and content server 22. The functionality of traffic filter 60 may be divided between multiple hardware hosts, for instance between network appliance 14 and a remote server computer. An artisan will know that alternatively, some or all of the functionality of traffic filter 60 described herein may be implemented in hardware (e.g., dedicated integrated circuit such as a field-programmable gate array-FPGA, etc.) or a combination of hardware and software.

In some embodiments, in addition to handshake encryption keys 50 specific to various front servers/IP addresses (as in conventional ECH activities described above in relation to FIG. 3), DNS server 18 further stores a surrogate encryption key 56, for instance, a public side of a public-private keypair associated with traffic filter 60. In response to a DNS query 42 requesting resolution of a domain name hosting content server 22, DNS server 18 returns a DNS reply 144 including the network address of front server 20. However, in contrast to conventional ECH as described above in relation to FIG. 3, in some embodiments of the present invention DNS reply 144 includes surrogate key 56 instead of the server-specific key 50. Following receipt of DNS reply 144, client device 12 may initiate an encrypted communication session with servers 22 by sending a client handshake message 132 to front server 20, wherein the domain name/SNI of the respective domain is hidden within an encrypted section 134. In contrast to conventional ECH, section 134 is encrypted using surrogate key 56 instead of genuine key 50 associated with front server 20.

In some embodiments, traffic filter 60 uses a surrogate decryption key 58 (e.g., a private key paired with surrogate encryption key 56) to decrypt section 134 thus recovering the respective SNI. Traffic filter 60 may then consult access policy database 24 and/or content index 25 to determine whether to allow access to the respective resource. When access is deemed unsafe or does not comply with the client's access policy, filter 60 may prevent client device 12 from accessing the respective resource, for instance by terminating the respective connection. When access is allowed, some embodiments of traffic filter 60 may request the genuine handshake encryption key associated with front server 20 from DNS server 18 and use key 50 to reformulate client handshake 132 by replacing original encrypted section 134 with a substitute encrypted section 234 wherein the respective SNI is encrypted according to genuine handshake encryption key 50. In a preferred embodiment, traffic filter 60 may produce a modified handshake 232 which is indistinguishable from a handshake that client device 12 would have sent out during a conventional ECH exchange (e.g., handshake 32 in FIG. 3). Traffic filter 60 may then forward modified handshake 232 to front server 20, which may use its handshake decryption key 52 to reveal the SNI and forward the respective handshake to the appropriate content server.

In some embodiments, the surrogate keypair 56-58 is non-specific in the sense that a single surrogate encryption key 56 may replace multiple genuine handshake encryption keys 50. However, surrogate keypair 56-58 may be specific to a set of clients (e.g., to a company or a home having multiple protected devices 12*a-e*), to a network device 14, to a domain name and/or IP address, etc. In such embodiments, server 18 may store multiple surrogate encryption keys 56 and selectively return one or another according, for instance, to an identity of the requesting client. When DNS requests from multiple clients are routed via a single network appliance 14 (see e.g., FIG. 1), server 18 may select which key 56 to include in DNS reply 144 according to an identity of appliance 14. In some such embodiments, all clients 12*a-e* accessing extended network 15 via appliance 14 may be protected according to the same contract/service-level agreement associated with appliance 14. A specific surrogate keypair 56-58 may then be associated with the respective contract.

In some embodiments, there may be multiple surrogate keypairs 56-58, each associated with a distinct category of Internet content. In an exemplary security-oriented embodiment, there may be distinct keypairs associated with domains/resources/services deemed safe and unsafe, respectively. In another example, DNS server 18 may store or produce a distinct key 56 for each of a plurality of categories or services, such as video streaming, news, e-commerce, social media, gambling, pornography, etc. In such embodiments, in response to receiving DNS query 42, server 18 may consult content index 25 and selectively attach a version of surrogate key 56 appropriate to the respective content category.

FIG. 5 shows an exemplary content of a client handshake message 132 according to some embodiments of the present invention. The actual content and ordering of the various data fields may vary from one communication protocol/version to another. In some embodiments, client handshake 132 comprises at least a field storing a set of client cryptographic values 36, i.e., values of various cryptographic parameters that are used to set up an encrypted communication session between the respective client device and content server. Exemplary client cryptographic values 36 include a public application key of the respective client device, i.e., a key that is used by content server 22 to encrypt a payload transmitted to client device 12. Other exemplary client cryptographic values 36 include a random number, a salt, a nonce, an initialization vector, etc., which is used by content server 22 to derive a set of application keys used in encrypting a payload transmitted to client device 12 under the respective session. In one example according to a member of the TLS family of protocols, handshake 132 may comprise a Client Hello message, and client cryptographic values 36 may include a content of a ClientRandom field of the respective Client Hello. (According to the TLS protocol, server 22 uses a content of the ClientRandom field to determine an application key for the respective session.) At least one of client cryptographic values 36 is specific to client device 12, for instance is determined by client device 12 for the purpose of establishing the respective encrypted communication session and/or identifies a client side of respective communication session.

In some embodiments, client handshake 132 further comprises a session identifier 38, for instance a number or token that allows uniquely associating handshake 132 with a specific encrypted communication session. In some embodiments, an instance of identifier 38 is included in all communications forming part of the respective session, thus enabling the communicating parties to exchange multiple messages using the same cryptographic parameters/keys without having to renegotiate them. For instance, client device 12 and/or content server 22 may maintain a mapping between each value of session identifier 38 and session-specific encryption/decryption keys, thus enabling carrying out multiple concurrent sessions by way of a selective retrieval of the correct key(s) for each distinct communication. In an exemplary embodiment according to a member of the TLS protocol family, identifier 38 may include a content of the SessionID field of a Client Hello handshake message. However, session identifier 38 is not limited to, and need not have the same format as the TLS SessionID field. Instead, some embodiments may use a content of the SessionID field in combination with other data when computing session identifier 38.

Handshake message 132 further comprises encrypted section 134 which may be used to transmit various handshake parameters in encrypted form. Section 134 may include, for instance, a server name indicator (SNI) of content server 22, among others. In some embodiments, section 134 is encrypted using surrogate handshake key 56 received from DNS server 18.

Figure 6:
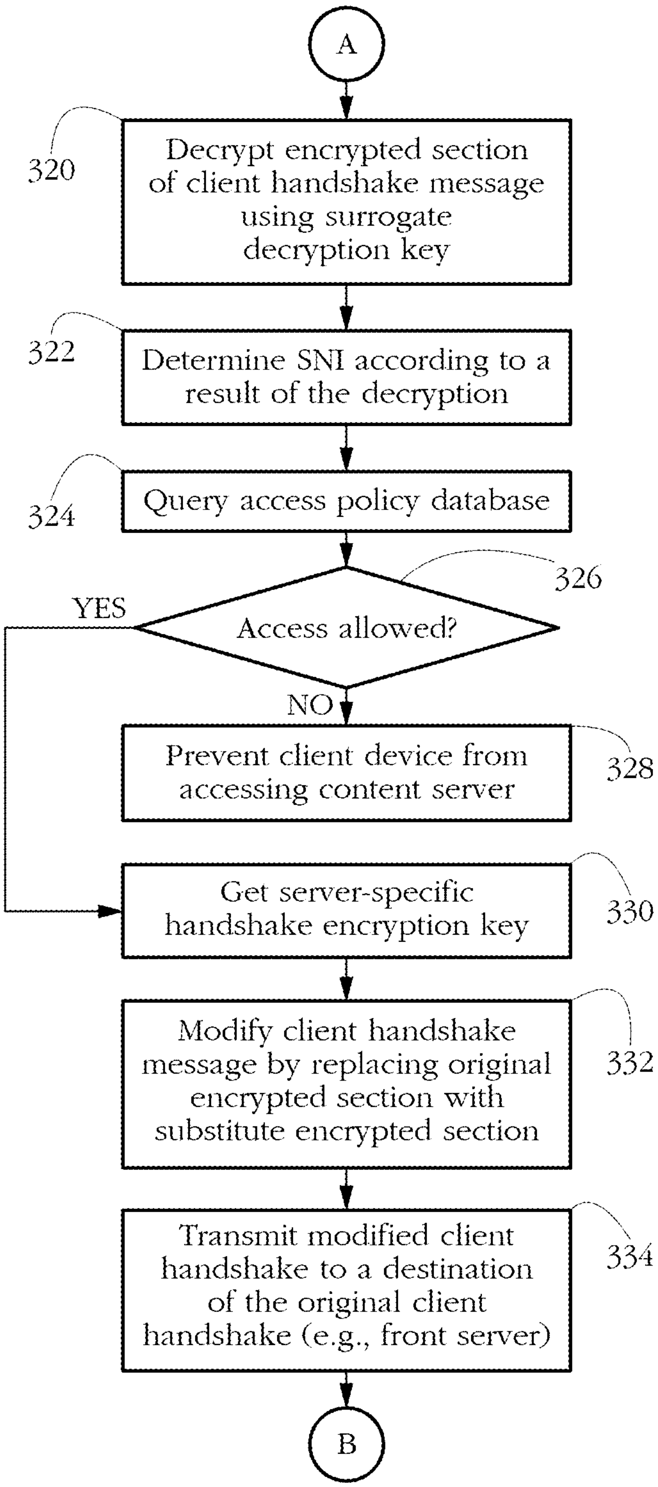
FIG. 6-A shows an exemplary sequence of steps carried out by a traffic filter according to some embodiments of the present invention.

FIGS. 6-A-B show an exemplary sequence of steps carried out by traffic filter 60 according to some embodiments of the present invention. In one exemplary embodiment, filter 60 executes on network appliance 14, i.e., a gateway device controlling traffic between local network 13 and extended network 15. In the sequence of steps illustrated in FIG. 6-A, filter 60 may intercept incoming communications/messages (step 304) and identify client handshakes sent by a protected client device attempting to establish an encrypted communication session (steps 308-310). In an exemplary embodiment using TLS, step 310 may comprise reading a value of a specific flag included in a header of the respective message to determine whether the respective message comprises a ClientHello. In embodiments wherein the entire client handshake message is encrypted (as opposed to just section 134), filter 60 may be unable to determine whether the respective message comprises a client handshake without decrypting it first. In such embodiments, step 310 may comprise attempting to decrypt the respective message using surrogate decryption key 58, and determining whether the respective message comprises a client handshake according to whether the decryption attempt was successful.

Some embodiments may be further configured to relay messages which are not client handshakes to their intended destination, unchanged (step 312). Such relayed messages may include server handshake messages and encrypted payload messages (see e.g., FIG. 2). Stated otherwise, in some embodiments traffic filter 60 does not interfere in an already established communication session between a client device and a content server.

In preparation for traffic filtering operations, in a step 302 filter 60 may obtain surrogate decryption key(s) 58. In one exemplary embodiment, surrogate keypair 56-58 may be generated by DNS server 18. Step 302 may then comprise retrieving decryption key(s) 58 from DNS server 18. However, such a procedure may be risky since it comprises transmitting a private key via a possibly insecure channel. Therefore, in preparation for transmitting key 58, filter 60 and server 18 may engage in a mutual authentication procedure. Furthermore, key 58 may be transferred in encrypted form, following a separate handshake between filter 60 and server 18.

In an alternative exemplary embodiment, surrogate keypair 56-58 may be generated by traffic filter 60. Decryption key 58 may therefore reside on computer-readable media of the computer system hosting traffic filter 60, while a copy of encryption key 56 may be transmitted to DNS server 18 and/or to a keyserver which may forward it to DNS server 18 upon request. Such a transaction is not considered risky since key 56 typically comprises the equivalent of a public key. However, due to particularities of the usual cryptographic algorithms, keypair 56-58 may be specific to the instance of traffic filter 60 that actually generated it. Therefore, each instance of traffic filter 60 may send DNS server 18 its own version of surrogate encryption key 56. Furthermore, to enable the traffic filtering functionality described herein, DNS server 18 may have to correctly associate each received DNS query 42 with a corresponding surrogate key 56 that is paired with the particular instance of filter 60 used by the respective client device. In one such exemplary embodiment wherein clients 12*a-e* access extended network 15 via network appliance 14 which also hosts traffic filter 60, DNS server 18 may associate all DNS queries 42 received from the respective clients with a respective instance of appliance 14, and reply with the version of surrogate key 56 associated with the respective instance of appliance 14/traffic filter 60.

In another exemplary embodiment, each DNS query 42 may be tagged with an identifier of the respective client device and/or network appliance 14/traffic filter 60. Such a tag may be included for instance in a TXT record of query 42. Server 18 may maintain a mapping between clients 12 and instances of filter 60 and selectively retrieve the correct surrogate key 56 according to the respective tag. These exemplary methods for generating and distributing surrogate keys also apply to embodiments which maintain a plurality of keypairs, each corresponding to a distinct category of content and/or service.

FIG. 6-B illustrates an exemplary sequence of steps carried out by traffic filter 60 in response to intercepting a client handshake. A step 320 may decrypt encrypted section 134 using surrogate decryption key 58, thus uncovering an identifier (e.g., SNI, domain name) of content server 22 (step 322). In a further step 324, filter 60 may determine whether to allow client device 12 access to the respective content server. In a computer security embodiment, step 324 may comprise looking up the SNI/domain name of server 22 in content index 25 to determine whether the respective SNI/domain name is associated with a computer security threat such as malicious software or online fraud. In a parental control and/or an application control embodiment, step 324 may comprise looking up the SNI/domain name in access policy database 24 to determine whether client device 12 is allowed to access the respective domain or content category. Step 324 may comprise formulating a query according to the respective SNI/domain name and further according to an identifier of client device 12 and transmitting the respective query to a server computer in charge of retrieving data from databases 24 and/or 25. The determination of whether to allow access or not may proceed further according to other criteria, such as an identity of a current user of the respective client device, a current time, a current geographical location of the respective client device, etc.

Some embodiments may enforce distinct access policies according to whether client device 12 is currently connected to local network 13 or not (e.g., whether a laptop is accessing the Internet from home or not). One such exemplary embodiment maintains a mapping between client devices 12*a-e* and instances of traffic filter 60 (or network appliances 14 hosting the respective instances of traffic filter 60). For instance, all client devices within a home may be mapped to one network appliance 14/contract. Such a mapping may be maintained and queried via a cloud service/web interface. Step 324 may then comprise looking up the respective mapping to determine whether the originator of client handshake 132 is associated/registered with the respective instance of traffic filter 60. A mismatch may indicate that the respective client device is currently not connected to its registered 'home' network appliance, but is instead roaming and accessing the Internet via another instance of traffic filter 60. In such situations, some embodiments of traffic filter 60 may enforce a more restrictive access policy than when respective client device is 'at home'. For instance, a simple embodiment may block all access attempts from client devices which are not registered to use the respective instance of traffic filter 60.

In one such exemplary roaming detection scenario, DNS server 18 may manage multiple surrogate keys 56, each such key associated with a particular instance of network filter 60 and/or with a particular network appliance 14 (see e.g., FIG. 1). Meanwhile, each client device may be registered/associated with a client-specific instance of filter 60 and/or network appliance 14 (i.e., its expected 'home'). In some embodiments, in response to receiving a DNS query, DNS server 18 may identify the originating client device, and return the surrogate key associated with the respective client's registered 'home'. When the respective client is roaming, any attempt to access the Internet via another instance of traffic filter 60 will cause a failure to decrypt client handshake 132 due to the key mismatch. Such a failure may be interpreted as an indicator of roaming, and may cause the respective instance of the traffic filter to apply a roaming access policy (e.g., block access).

In response to a determination that access of client device 12 to content server 22 is not allowed (a step 326 returns a NO), traffic filter 60 may block access to the respective resource, using any method known in the art. For instance, filter 60 may prevent client handshake 132 from reaching front server 20, interrupt the respective connection, etc.

When step 326 determines that access is allowed, some embodiments may simply relay client handshake 132 to its destination, without modification. Since handshake 132 is encrypted using surrogate key 56 instead of the genuine handshake key 50, front server 20 may fail to decrypt it. However, such embodiments rely on a recovery mechanism built into protocols such as ECH, by which server 20 may engage the respective client device 12 in another handshake exchange.

In other exemplary embodiments, in a step 330 traffic filter 60 may determine an identity of front server 20 according to the intercepted client handshake (e.g., according to a destination IP address of handshake message 132) and retrieves genuine handshake encryption key 50 associated with front server 20. Step 330 may comprise, for instance, carrying out a DNS transaction with DNS server 18, wherein filter 60 requests resolution of the domain name/SNI determined in step 322, and server 18 returns handshake key 50 as part of a DNS reply. In embodiments wherein traffic filter 60 maintains a cache of recently used keys, step 330 comprises retrieving key 50 from the local cache according to a SNI included in handshake message 132 and/or according to a destination IP address of handshake message 132.

In a further sequence of steps 332-334, traffic filter 60 may modify client handshake 132 and transmit a modified handshake 232 to the destination of original handshake 132 (e.g., front server 20), respectively. In some embodiments, modifying handshake message 132 comprises replacing encrypted section 134 with a substitute encrypted section 234 comprising the SNI/domain name of content server 22 (obtained by decrypting section 134), this time encrypted using genuine handshake key 50. Stated otherwise, in some embodiments sections 134 and 234 have identical cleartext content, however section 134 is encrypted using surrogate key 56, while section 234 is encrypted using genuine key 50.

In formulating modified handshake 232, some embodiments explicitly keep the rest of handshake message 132 intact, including a header, client cryptographic values 36, session identifier 38, etc. Such embodiments rely on the observation that, to ensure privacy while still enforcing an access policy, traffic filter 60 should intrude as little as possible in communications between client device 12 and content server 22. In particular, in response to determining that access to server 22 is allowed, traffic filter 60 does not act as a conventional man-in-the-middle (MITM) by independently re-negotiating separate communication sessions with device 12 and/or server 22. Instead, by forwarding to the server a handshake that is almost identical to the client-generated handshake 132 (apart from re-encrypted section 234), and by further relaying a server handshake message back to the respective client, some embodiments ensure that the cryptography (e.g., application keys) of the respective communication session is negotiated directly between client device 12 and content server 22. This security strategy is privacy-preserving by denying filter 60 the capability to decrypt a payload of the respective session.

In alternative embodiments configured to generate a plurality of keypairs 56-58, each keypair specific to a distinct category of content and/or service, step 320 (FIG. 6-B) may comprise attempting to decrypt section 134 using multiple decryption keys 58. The key enabling a successful decryption may thus identify the category of content/service that the respective client device is attempting to access. Traffic filter 60 may then use this information to determine whether to allow access. For instance, in a simple computer security embodiment wherein one keypair is associated with malicious content and another keypair is associated with benign content, traffic filter 60 may first attempt to decrypt client handshake 132 with the malice-indicative decryption key. A successful decryption may indicate that DNS server 18 has already identified a potential threat related to the respective Internet domain, and therefore filter 60 may block access without having to carry out further evaluations. Conversely, when decryption using the malice-indicative key is unsuccessful, some embodiments of traffic filter 60 may simply relay the respective handshake to its destination. Such embodiments may facilitate traffic filtering by dividing the computational load generated by step 326 between DNS sever 18 and traffic filter 60.

Figure 7:
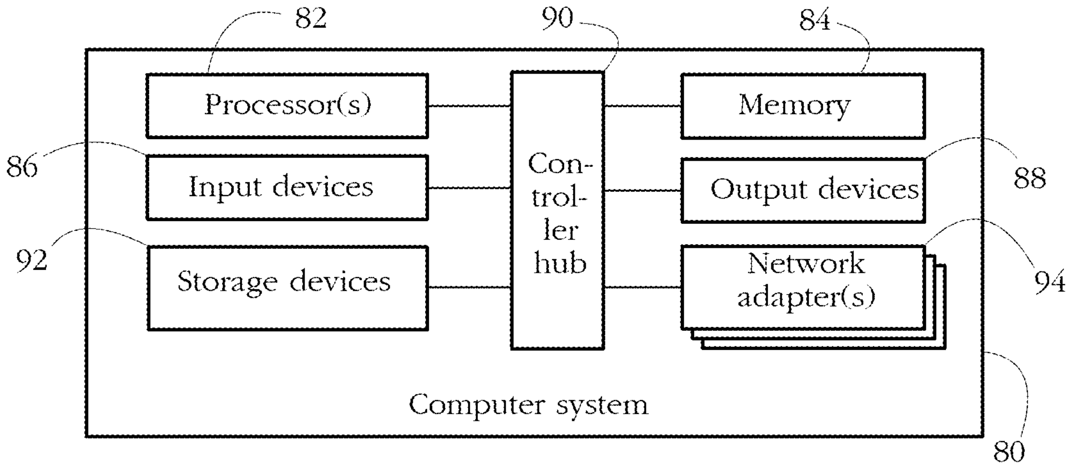
FIG. 7 illustrates an exemplary hardware configuration of a computer system programmable to carry out methods and algorithms according to some embodiments of the present invention.

The description above showed various methods and algorithms which may be embodied as computer programs executed by a general-purpose hardware processor, but a skilled artisan will understand that the respective functionality may also be implemented using dedicated hardware components, such as an application-specific integrated circuit (ASIC) or field-programmable gate array (FPGA). FIG. 7 illustrates an exemplary hardware configuration of a computer system 80 programmable to carry some of the methods and algorithms described herein. The illustrated configuration is generic and may represent for instance any of client devices 12*a-e*, network appliance 14, DNS server 18, and front server 20, among others. An artisan will know that the hardware configuration of some devices (e.g., mobile telephones, smartwatches, servers, routers) may differ somewhat from the one illustrated in FIG. 7.

The illustrated computer system comprises a set of physical devices, including a hardware processor 82 and a memory unit 84. Processor 82 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 82 in the form of a sequence of processor instructions (e.g. machine code or other type of encoding). Memory unit 84 may comprise volatile computer-readable media (e.g. DRAM, SRAM) storing instructions and/or data accessed or generated by processor 82.

Input devices 86 may include computer keyboards, mice, and microphones, among others, including the respective hardware interfaces and/or adapters allowing a user to introduce data and/or instructions into the respective computer system. Output devices 88 may include display devices such as monitors and speakers among others, as well as hardware interfaces/adapters such as graphic cards, allowing the illustrated computing appliance to communicate data to a user. In some embodiments, input devices 86 and output devices 88 share a common piece of hardware, as in the case of touch-screen devices. Storage devices 92 include computer-readable media enabling the non-volatile storage, reading, and writing of software instructions and/or data. Exemplary storage devices 92 include magnetic and optical disks and flash memory devices, as well as removable media such as CD and/or DVD disks and drives. The set of network adapters 94, together with associated communication interface(s), enables the illustrated computer system to connect to a computer network such as local network 13 (FIG. 1) and/or to other devices/computer systems. Controller hub 90 generically represents the plurality of system, peripheral, and/or chipset buses, and/or all other circuitry enabling the communication between processor 82 and devices 84, 86, 88, 92, and 94. For instance, controller hub 90 may include a memory controller, an input/output (I/O) controller, and an interrupt controller, among others. In another example, controller hub 90 may comprise a northbridge connecting processor 82 to memory 84, and/or a southbridge connecting processor 82 to devices 86, 88, 92, and 94.

The exemplary systems and methods described above allow selectively controlling how a heterogeneous multitude of client devices (personal computers, smartphones, IoT devices like TVs, thermostats, door locks, refrigerators, wearables, etc.) access the Internet. Such control is critical to applications such as computer security (protecting users and devices from malicious content and/or Internet fraud), parental control (monitoring and/or restricting access of certain devices/users to certain online content), and application control (monitoring and/or restricting the use of selected software such as social media, streaming, gaming, gambling, and instant messaging applications), among others. Selectivity herein refers to the ability to apply device-specific and/or user-specific access policies.

Most modern Internet communications are encrypted, for instance using a version of a transport layer security (TLS) family of protocols. In such cases, an encrypted communication session comprises an initial handshake exchange wherein the parties negotiate a set of encryption keys, followed by transmission of the actual communication payload (e.g., an HTTP request, a DNS query, etc.) encrypted using the session-specific negotiated keys. Some conventional access control methods rely on information extracted from the handshake exchange, such as a domain name and/or IP address of the end server. However, such methods have been recently set back by the advent of encrypted communication protocols such as encrypted client hello (ECH), wherein a part of a handshake is itself encrypted using a handshake key distinct from the application keys negotiated during the handshake. The encrypted handshake is used, for instance, to improve privacy by hiding an identity of the end server from third parties. Some embodiments of the present invention specifically address this problem.

In some embodiments, a traffic filter located for example on a network gateway device collaborates with a DNS server to gain access to the encrypted part of a client handshake. The DNS server may engage with the client device in a domain name resolution procedure, during which the DNS server may provide the client device with a surrogate key masquerading as a genuine handshake key associated with the end server (or with a front server controlling access to the end server, as in several popular cloud computing configurations). In some embodiments, the traffic filter may intercept and decrypt a client handshake using a decryption key paired with the surrogate key, and therefore reveal the identity of the end server that the client device is currently trying to connect to. The traffic filter may then use any known method to determine whether to allow access to the respective end server. When access is not allowed, the traffic filter may prevent the respective client handshake from reaching its destination. When access is allowed, the traffic filter may retrieve the genuine handshake key from the DNS server and modify the intercepted handshake by re-encrypting the identifier of the end server using the genuine handshake key. The modified client handshake is then forwarded to its intended destination, enabling the respective client device to establish a session and to exchange encrypted communications with the respective end server.

One conventional strategy for tampering with encrypted communications is known as a man-in-the-middle (MITM) attack, wherein a malicious entity prevents the establishment of a direct encrypted communication session between a client and a server, and instead negotiates two separate sessions, one with the client, and the other one with the server. In each of these sessions, the attacker masquerades as the other legitimate communication party. By negotiating cryptographic keys with both the client and the server, the attacker may compromise privacy by gaining access to the communication payload itself. However, several modern communication protocols have included MITM countermeasures, for instance by introducing additional handshake steps requiring authentication of the communicating parties via a system of certificates.

Some embodiments of the present invention avoid operating in a MITM configuration, by explicitly ensuring that any communication session is established directly between the respective client device and end server. In some embodiments, the modified handshake message transmitted to the end server is almost identical to the original intercepted handshake message, except that the cyphertext part uses a different handshake encryption key. In particular, the modified handshake preserves the session-specific, client-determined parameter values such as a Client Random and/or a Session ID of the original intercepted handshake. Some embodiments further relay a server handshake message sent by the end server in response to the modified handshake message to the respective client device without modification. Such actions enable the respective client device and server to establish a single direct encrypted communication session and authenticate each other seamlessly. Furthermore, not engaging in actual negotiations for application keys with either of the communicating parties prevents the traffic filter from being able to decrypt the communication payload. Access control is therefore enforced without compromising the secrecy of the communication.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of a computer system to:

intercept an original handshake message sent by a first computer for establishing an encrypted communication session between the first computer and a content server, the original handshake message including an encrypted section storing an identifier of the content server, the encrypted section being encrypted with a surrogate handshake encryption key distinct from a genuine handshake encryption key of the content server;

decrypt the encrypted section to retrieve the identifier of the content server;

determine according to the identifier of the content server whether an access policy associated with the first computer allows the first computer to access the content server; and in response, when the access policy allows the first computer to access the content server:

modify the original handshake message by replacing the encrypted section with a substitute encrypted section storing the identifier of the content server, the substitute encrypted section encrypted using the genuine handshake encryption key of the content server, transmit the modified handshake message to a destination of the original handshake message, and in response to intercepting a server payload message sent by the content server within the encrypted communication session, the server payload message including a server payload encrypted using a genuine application encryption key of the first computer, relay the server payload message to the first computer.

2. The method of claim 1, wherein another message sent by the content server within the encrypted communication session comprises a cryptographic parameter value used by the first computer to derive a genuine application encryption key of the content server, for encrypting a client payload transmitted within the encrypted communication session.

3. The method of claim 1, wherein the original handshake message comprises a cryptographic parameter value used by the content server to derive the genuine application key of the first computer, and wherein the modified handshake message comprises the cryptographic parameter value.

4. The method of claim 1, wherein the original handshake message comprises a session identifier distinguishing the encrypted communication session from other sessions, and wherein the modified handshake message includes the session identifier.

5. The method of claim 1, further comprising employing a DNS server, in response to receiving a request to resolve a domain name of the content server, to transmit to the first computer the surrogate handshake encryption key.

6. The method of claim 5, further comprising employing the at least one hardware processor to:

retrieve a surrogate decryption key from the DNS server; and decrypt the encrypted section using the surrogate decryption key.

7. The method of claim 5, further comprising employing the at least one hardware processor to:

generate a cryptographic keypair comprising the surrogate encryption key and a surrogate decryption key;

transmit the surrogate encryption key to the DNS server for further transmission to the first computer; and decrypt the encrypted section according to the surrogate decryption key.

8. The method of claim 5, further comprising employing the DNS server, in preparation for transmitting the surrogate encryption key to the first computer, to:

select a content category from a plurality of content categories according to the domain name, the content category indicative of a type of content distributed by the content server; and in response, select the surrogate encryption key from a plurality of surrogate encryption keys according to the selected content category.

9. The method of claim 8, comprising:

employing the DNS server to select the surrogate encryption key from the plurality of surrogate encryption keys according to whether the content server distributes malicious content; and employing the at least one hardware processor, in response to decrypting the encrypted section, to interpret the decryption as indicating that the content server distributes malicious content.

10. The method of claim 1, further comprising determining the genuine handshake encryption key of the content server by:

transmitting a DNS query to a DNS server, the DNS query formulated according to the identifier of the content server; and in response, receiving the genuine handshake encryption key of the content server from the DNS server.

11. A computer system having at least one hardware processor programmed to execute a traffic filter configured to:

intercept an original handshake message for establishing an encrypted communication session between a first computer and a content server, the original handshake message including an encrypted section storing an identifier of the content server, the encrypted section being encrypted with a surrogate handshake encryption key distinct from a genuine handshake encryption key of the content server;

decrypt the encrypted section to retrieve the identifier of the content server;

determine according to the identifier of the content server whether an access policy associated with the first computer allows the first computer to access the content server; and in response, when the access policy allows the first computer to access the content server:

modify the original handshake message by replacing the encrypted section with a substitute encrypted section storing the identifier of the content server, the substitute encrypted section encrypted using the genuine handshake encryption key of the content server, transmit the modified handshake message to a destination of the original handshake message, and in response to intercepting a server payload message sent by the content server within the encrypted communication session, the server payload message including a server payload encrypted using a genuine application encryption key of the first computer, relay the server payload message to the first computer.

12. The computer system of claim 11, wherein another message sent by the content server within the encrypted communication session comprises a cryptographic parameter value used by the first computer to derive a genuine application encryption key of the content server, for encrypting a client payload transmitted within the encrypted communication session.

13. The computer system of claim 11, wherein the original handshake message comprises a cryptographic parameter value used by the content server to derive the application key of the first computer, and wherein the modified handshake message comprises the cryptographic parameter value.

14. The computer system of claim 11, wherein the original handshake message comprises a session identifier distinguishing the encrypted communication session from other sessions, and wherein the modified handshake message includes the session identifier.

15. The computer system of claim 11, further comprising a DNS server configured, in response to receiving a request to resolve a domain name of the content server, to transmit to the first computer the surrogate handshake.

16. The computer system of claim 15, wherein the at least one hardware processor is further configured to:

retrieve a surrogate decryption key from the DNS server; and decrypt the encrypted section using the surrogate decryption key.

17. The computer system of claim 15, wherein the at least one hardware processor is further configured to:

generate a cryptographic keypair comprising the surrogate encryption key and a surrogate decryption key;

transmit the surrogate encryption key to the DNS server for further transmission to the first computer; and decrypt the encrypted section according to the surrogate decryption key.

18. The computer system of claim 15, wherein the DNS server is further configured, in preparation for transmitting the surrogate encryption key to the first computer, to:

select a content category from a plurality of content categories according to the domain name, the content category indicative of a type of content distributed by the content server; and in response, select the surrogate encryption key from a plurality of surrogate encryption keys according to the selected content category.

19. The computer system of claim 18, wherein:

the DNS server is configured to select the surrogate encryption key from the plurality of surrogate encryption keys according to whether the content server distributes malicious content; and the at least one hardware processor is further configured, in response to decrypting the encrypted section, to interpret the decryption as indicating that the content server distributes malicious content.

20. The computer system of claim 11, further comprising determining the genuine handshake encryption key of the content server by:

transmitting a DNS query to a DNS server, the DNS query formulated according to the identifier of the content server; and in response, receiving the genuine handshake key of the content server from the DNS server.

21. A non-transitory computer-readable medium storing instructions which, when executed by at least one hardware processor of a computer system, cause the computer system to execute a network filter configured to:

intercept an original handshake message for establishing an encrypted communication session between a first computer and a content server, the original handshake message including an encrypted section storing an identifier of the content server, the encrypted section being encrypted with a surrogate handshake encryption key distinct form a genuine handshake encryption key of the content server;

decrypt the encrypted section to retrieve the identifier of the content server;

determine according to the identifier of the content server whether an access policy associated with the first computer allows the first computer to access the content server; and in response, when the access policy allows the first computer to access the content server:

modify the original handshake message by replacing the encrypted section with a substitute encrypted section storing the identifier of the content server, the substitute encrypted section encrypted using the genuine handshake encryption key of the content server, transmit the modified handshake message to a destination of the original handshake message, and in response to intercepting a server payload message sent by the content server within the encrypted communication session, the server payload message including a server payload encrypted using a genuine application encryption key of the first computer relay the server payload message to the first computer.

* * * * *